US009537950B2

(12) United States Patent
Ibasco et al.

(10) Patent No.: US 9,537,950 B2
(45) Date of Patent: Jan. 3, 2017

(54) SYSTEM AND METHOD FOR THE PROVISION OF CONTENT TO A SUBSCRIBER

(75) Inventors: Alex D. Ibasco, Makati (PH); Paolo B. Laflores, Makati (PH); Oliver L. Ubalde, Makati (PH); Jose Lorenzo Losantas, Makati (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 433 days.

(21) Appl. No.: 13/702,385

(22) PCT Filed: May 30, 2011

(86) PCT No.: PCT/SG2011/000198
§ 371 (c)(1),
(2), (4) Date: Dec. 6, 2012

(87) PCT Pub. No.: WO2011/155900
PCT Pub. Date: Dec. 15, 2011

(65) Prior Publication Data
US 2013/0080588 A1    Mar. 28, 2013

(30) Foreign Application Priority Data
Jun. 9, 2010    (SG) ................................ 201004043-4

(51) Int. Cl.
*H04L 29/08* (2006.01)
*H04W 4/02* (2009.01)
(Continued)

(52) U.S. Cl.
CPC ........... *H04L 67/1097* (2013.01); *G06Q 30/02* (2013.01); *H04L 67/18* (2013.01);
(Continued)

(58) Field of Classification Search
None
See application file for complete search history.

(56) References Cited

U.S. PATENT DOCUMENTS 6,298,348 B1    10/2001  Eldering
7,130,866 B2 *  10/2006  Schaffer ................. H04H 60/46
(Continued)

FOREIGN PATENT DOCUMENTS

CN    101141484 A    3/2008
JP    2001243239 A2    9/2001
(Continued)

OTHER PUBLICATIONS

Aalto, Lauri, et al. "Bluetooth and WAP push based location-aware mobile advertising system." Proceedings of the 2nd international conference on Mobile systems, applications, and services. pp. 49-68, ACM, 2004.*

*Primary Examiner* — Ranodhi Serrao
*Assistant Examiner* — James Fiorillo
(74) *Attorney, Agent, or Firm* — MKG, LLC

(57) ABSTRACT

System and method for providing content to a plurality of subscribers in a communications network. The method includes receiving event parameters associated with an event from a third party; receiving location information for each subscriber from the communications network; comparing the event parameters with the location information for each subscriber to identify one or more subscribers within the plurality of subscribers within a predetermined range of the event associated with the event parameters; profiling each of the one or more subscribers to produce a profile rating and/or profile score wherein the profile rating and/or profile score are indicative of the likelihood of a given subscriber to attend the event; sorting the one or more subscribers into a number of categories based on the profile rating and/or profile score; compiling content for each category of sub- (Continued)

scribers; and delivering the content to said one or more subscribers within range of the event.

24 Claims, 4 Drawing Sheets

(51) Int. Cl.
| | |
|---|---|
| G06F 17/30 | (2006.01) |
| G06Q 10/10 | (2012.01) |
| G06Q 10/02 | (2012.01) |
| G06Q 30/02 | (2012.01) |
| H04W 8/18 | (2009.01) |
| H04W 28/18 | (2009.01) |
| H04W 64/00 | (2009.01) |

(52) U.S. Cl.
CPC .............. *H04L 67/22* (2013.01); *H04L 67/26* (2013.01); *H04L 67/2823* (2013.01); *H04L 67/306* (2013.01); *H04W 4/02* (2013.01); *G06F 17/3087* (2013.01); *G06Q 10/02* (2013.01); *G06Q 10/10* (2013.01); *G06Q 30/0241* (2013.01); *H04L 67/2895* (2013.01); *H04W 4/023* (2013.01); *H04W 8/18* (2013.01); *H04W 28/18* (2013.01); *H04W 64/00* (2013.01)

(56) References Cited

U.S. PATENT DOCUMENTS

| | | | | |
|---|---|---|---|---|
| 2001/0018340 A1* | 8/2001 | Tagi | ................ | H04M 3/42348 455/414.1 |
| 2003/0236832 A1* | 12/2003 | McIntyre | ................ | H04L 29/06 709/204 |
| 2004/0260605 A1* | 12/2004 | McIntyre | ............... | G06Q 30/02 705/14.39 |
| 2005/0255853 A1* | 11/2005 | Ewert | ................... | H04W 4/02 455/456.1 |
| 2007/0192409 A1* | 8/2007 | Kleinstern | ............. | G06Q 10/10 709/203 |
| 2007/0239517 A1* | 10/2007 | Chung | ................... | G06Q 30/02 705/14.53 |
| 2008/0091518 A1 | 4/2008 | Eisenson et al. | | |
| 2008/0091771 A1* | 4/2008 | Allen | ..................... | G06Q 10/06 709/203 |
| 2008/0222127 A1* | 9/2008 | Bergin | .................. | G06Q 10/10 |
| 2008/0248809 A1 | 10/2008 | Gower | | |
| 2008/0261526 A1* | 10/2008 | Suresh | ................... | G06Q 30/02 455/41.2 |
| 2008/0288354 A1 | 11/2008 | Flinn et al. | | |
| 2009/0248607 A1* | 10/2009 | Eggink | ............... | G06F 17/3087 706/54 |
| 2010/0048222 A1* | 2/2010 | Gracieux | ............. | H04L 63/107 455/456.1 |
| 2010/0153488 A1* | 6/2010 | Mittal | ..................... | H04W 4/02 709/203 |
| 2010/0217660 A1* | 8/2010 | Biswas | .................. | G06Q 30/02 705/14.38 |
| 2010/0222041 A1* | 9/2010 | Dragt | .................... | G06Q 30/02 455/414.2 |
| 2010/0291907 A1* | 11/2010 | MacNaughtan | ... | G06Q 30/0241 455/414.1 |
| 2011/0022452 A1* | 1/2011 | Carney, II | ............. | G06Q 30/02 705/14.5 |
| 2011/0071902 A1* | 3/2011 | Tan | ........................ | G06Q 30/02 705/14.49 |
| 2011/0142016 A1* | 6/2011 | Chatterjee | .............. | G06Q 30/02 370/338 |
| 2012/0277994 A1* | 11/2012 | Broome | ................. | G06Q 10/02 701/537 |
| 2013/0262588 A1* | 10/2013 | Barak | ..................... | H04L 67/22 709/204 |

FOREIGN PATENT DOCUMENTS

| | | |
|---|---|---|
| JP | 2005535030 A | 11/2005 |
| WO | 2004013996 A1 | 2/2004 |
| WO | 2005001735 A2 | 1/2005 |
| WO | 2009082784 A1 | 7/2009 |

\* cited by examiner

SYSTEM AND METHOD FOR THE PROVISION OF CONTENT TO A SUBSCRIBER

FIELD OF THE INVENTION

The present invention relates generally to the provision of content to one or more subscribers. In particular although not exclusively the present invention relates to a system and method for identifying and profiling for subscribers to facilitate the delivery of content specially targeted at one or more subscribers.

BACKGROUND

The increase in the availability of Internet Protocol (IP) and mobile communications services has presented new avenues for the distribution of advertising content to the market place.

However, the shear volume of advertising that permeates across these communications services e.g. spam or other unsolicited promotional material has resulted in the average user becoming somewhat desensitised to such on-line marketing material.

To improve the effectiveness of these new media campaigns, targeting is often employed. In essence targeting simply directs relevant content to desired demographic groups based on information contained in a subscriber profile. One such use of targeting content to subscribers is discussed in U.S. Pat. No. 6,298,348 to Eldering.

Under the system of Eldering, a consumer profile is developed and updated based on information relating to their purchasing history. The purchasing records for a consumer are transmitted to the consumer profiling system of Eldering, which then updates the consumer profiles based on product characterizations which include demographic profiles of the typical purchaser of that product, as well as the product brand and size. The consumer profiles can be accessed by advertisers, who then transmit information characterizing their ads to the system of Eldering. The ad information is then correlated with the consumer profile to produce a measure of the applicability of the ad to that consumer.

Another example of the use of targeting is discussed in Published US Patent Application No. 20080248809 to Gower. The system of Gower provides activity based information for a given location to subscribers. The virtual location of Gower may be considered as being a virtual location defined in terms of activity or activities being performed at the location. Consequently the virtual location may be an actual physical or geographical location, or it may be defined solely according to the services provided therein, for example a virtual location may be defined by a WiFi identifier which could change its physical location.

The activity based information provided by the system of Gower can be utilised by new devices entering the virtual location, or devices already in the virtual location, to reconfigure themselves, dependent on the activities being performed by other devices in the virtual location. For example, if the virtual location is associated with a library, this may result in a lot of wireless connections being established to download the library's information index, and this activity based information could be used to automatically present the user of a device entering the virtual location with an option to do the same activity.

A further example of the use of targeting in the delivery of content is discussed in US Patent Publication No 20080288354 to Flinn et al. Flinn concerns a computer-based systems architecture in which users may be represented directly within the system based on their usage behaviours. The system of Flinn captures usage information from one or more users interacting with the system and then categorizes, and clusters the captured usage information to model usage behaviours of the one or more users. In addition the usage behaviour of the recipient Flinn also takes into consideration advertising recipient's location this may be the recipient's current location or one or more historical locations.

One example of the use of the system and method of Flinn is the provision of advertising. In such instances the system of Flinn automatically determines the desired advertising recipient's location. In addition to the location determination the system of Flinn also incorporates the recipient's inferences of preferences derived from usage behaviours to direct appropriate content to the recipient.

While the above systems provide improvements over the standard mass broadcast paradigm they can still result in unnecessary or unwanted network traffic. This is particularly the case in mobile communication systems where there is some overlap between cell coverage i.e. a subscriber could be in two or more network locations simultaneously. Accordingly there is a need for the provision of a profiling system and method that can account for the movement of a subscriber within a network to enable the delivery of targeted content to a subscriber. Furthermore it would be advantageous to provide a system and method for the delivery of content that further enhances content conversion and which does not impose undue burden on existing network infrastructure.

SUMMARY OF THE INVENTION

Accordingly in one aspect of the present invention there is provided a method of profiling a plurality of subscribers of a communications network the method comprising the steps of:

receiving a set of event parameters associated with an event from a third party;

receiving location information for each subscriber within the plurality of subscribers from the communications network;

comparing the event parameters from said third party with the location information for each subscriber to identify one or more subscribers within the plurality of subscribers within a predetermined range of the event associated with the event parameters;

profiling each of the one or more subscribers to produce a profile rating and/or profile score wherein the profile rating and/or profile score are indicative of the likelihood of a given subscriber to attend the event;

sorting the one or more subscribers into a number of categories based on the profile rating and/or profile score;

compiling content for each category of subscribers wherein the content for each category of subscriber contains information specific to its subscriber category;

delivering the content to said one or more subscribers within range of the event.

The event may include concerts, sporting events, movies or the like. Alternatively the event may be an identifier for a particular service or limited time promotional offers. The event parameters may include such information as event name, a specified location, the date and time the event is scheduled for and whether the event is a reoccurring event.

Preferably the location information includes information as to the subscribers current location within the network and the geographical location information of the network access point to which they are connected. The location information may also include information as to the coverage range of the network access point currently servicing the subscriber.

In the case where the network is a mobile communications network the location information includes information as to the current cell ID and geographical location of the base station to which the subscriber is connected. In such instances the location information may also be augmented by information received from the subscriber's handset. The location information may be augmented by any of a number of possible positioning mechanisms, such as uplink time of arrival (TOA), enhanced observed time difference (E-OTD), global positioning system (GPS) assisted, etc. The information provided by the subscriber's handset may include the subscriber's MSISDN, IMSI, and/or IMEI and handset status (on/off).

The step of comparing the event parameters preferably includes firstly converting an event location to a longitude and latitude bearing for comparison with a listing of geographical locations of each access point in the network.

The method may also include the step of masking specific portions of the location information. The step of masking may include mapping the subscriber MSISDN to an identification number assigned to the subscriber. Suitably the identification number may be assigned to the subscriber during the profiling step. Alternatively the identification number may be the account number assigned by the network service provider to the subscriber.

Preferably the step of profiling one or more subscribers comprises logging the location information to determine movement patterns of the one or more subscribers. The logging of location information may include logging prolonged static periods, repetitive ingress or egress at particular locations or across multiple locations and the time at which these movements occur.

The profile score and/or profile rating are produced by a simple instance based count i.e. amount of time one or more subscribers attend a specified event. The instance based count may include or exclude cases of partial attendance based on operator defined preference, and where it is included the criteria for partial attendance may also be operator defined.

Suitably the profile rating and/or profile score may be modified as additional information on subscriber transactions is gathered from the network. For example information on the subscriber actions such as signing up to a service, purchase through mobile ad, usage and VAS transactions and the like may be utilised to derive and/or refine the profile rating and/or profile score.

A weighting may also be assigned to each event. The weightings may be assigned on the basis of event type e.g. a single location may host a variety of events such as college sporting games, professional football matches, concerts etc. In such instances the weighting applied to a specific event at a given location may vary given the event type in order to identify particular target behavioural or profile categories. In the case where a weighting is applied to the profile score and/or profile rating, the profile score and/or profile rating becomes the instance based count multiplied by the weighting assigned to the associated event.

In accordance to a second aspect of the present invention there is a system for providing content to a plurality of subscribers of a communications network, the system comprising a location based system arranged to receive location information for each subscriber within the plurality of subscribers from the communication network; an event management system arranged to receive a set of event parameters associated with an event from a third party; and a profiling engine arranged to compare the event parameters with the location information for each subscriber to identify one or more subscribers of the plurality of subscribers within a predetermined range of the event and profile the identified one or more subscribers to produce a profile rating and/or profile score for each subscriber; wherein the profile rating and/or profile score are indicative of the likelihood of a given subscriber to attend the event and the content provided to the plurality of subscribers are compiled according to the profile rating and/or profile score.

The identified one or more subscribers may further be sorted into a number of categories based on the profile rating and/or profile score. In such a case, the compiled content for each category of subscribers may contain information specific to its subscriber category.

Preferably the event parameters include at least one of the following parameters: event name, event location, event date and event frequency.

Preferably a profiling weight is assigned to each event. The profile score and/or profile rating thus may be an instance based count multiplied by the profiling weight.

Preferably the profile score and/or profile rating is a probabilistic rating of the likelihood of each subscriber belonging to a particular behaviour or profile category.

The system may present the third party with a report of the various behavioural or profile categories a subscriber may belong. Such report categories may be based on an aggregate of events for each subscriber at a given event locations.

BRIEF DESCRIPTION OF THE DRAWINGS

In order that this invention may be more readily understood and put into practical effect, reference will now be made to the accompanying drawings, which illustrate preferred embodiments of the invention, and wherein.

DETAILED DESCRIPTION

Figure 1:
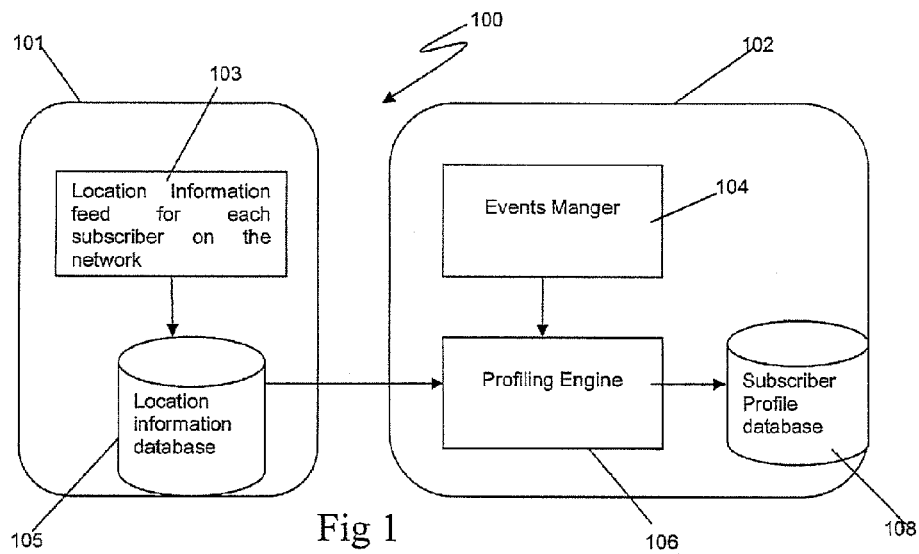
FIG. 1 is a schematic diagram of the system architecture of the profiling system according to one embodiment of the present invention.

With reference to FIG. 1 there is illustrated the basic system architecture of a content delivery system 100 according to one embodiment of the present invention. As shown the system includes a location based system 101 and events management system 102.

The location based system (LBS) 101 provides a data feed of subscriber location update data from the network to the event management system. In this particular example the location update data of the subscribers on the network 103 is firstly collated into a single database 105 prior to being forwarded to the events management system 102.

The events management system 102, includes an events manager 104 and a profiling engine 106. The events manager 104 provides an end user such as an advertiser or network owner, with a portal e.g. web portal or the like, through which to input specific event parameters defining the subscriber profile type they wish to capture. The event parameters may include such information as an event name (like concerts, basketball games, movies, etc), a specified location, date and time of the event, recurrence etc. The event specified in the event parameters may also have a set of associated behavioural or profiling weights.

The event parameters are then passed to the profiling engine 106 where they are then matched with the location update data provided from the database of location data 105. As a result of the matching process a set of subscriber profiles corresponding to the end users desired events parameters are then stored in a profiles database 108. The events management system 102 may then provide the compiled subscriber profiles as list, a data feed for another database/system or a suitable file type that can be processed by the end-user system.

Figure 2:
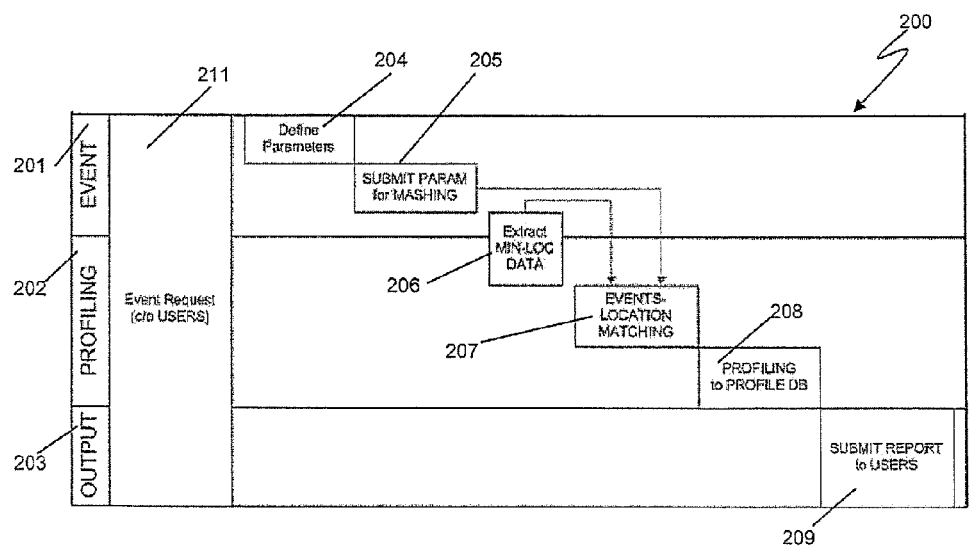
FIG. 2 is a schematic diagram of the process architecture of the profiling system according to one embodiment of the present invention.

FIG. 2 depicts the process architecture of the content delivery system of FIG. 1. As shown the processing architecture 200 is divided into three main stages: event 201, profiling 202 and output 203. The event stage 201 includes the entry of the relevant event parameters from the end user 204 and the forwarding of the parameters 205 to the profiling engine 106. As shown, the extraction and forwarding 206 of the subscriber location update data occurs between the events stage 201 and profiling stages 202.

During the profiling stage 202, the profiling engine 106 performs the events and location matching 207 and outputs subscriber profiles matching the events data parameters set by the end user to the profiles database 208. The results of the profiling process are then outputted to the end user 209 during the output stage 203.

As shown in FIG. 2 the end user is free at any processing stage to send an event request 201. On receipt of the event request the system forwards a report to the end user identifying the subscribers with profiles that fit the specified event criteria. As the event criteria specify various activities or behaviours that are to be profiled e.g. attendance of an event, passing through the entrance of a mall, stadium etc it is possible to sort subscribers into categories based on the profile score and/or profile rating.

Figure 3:
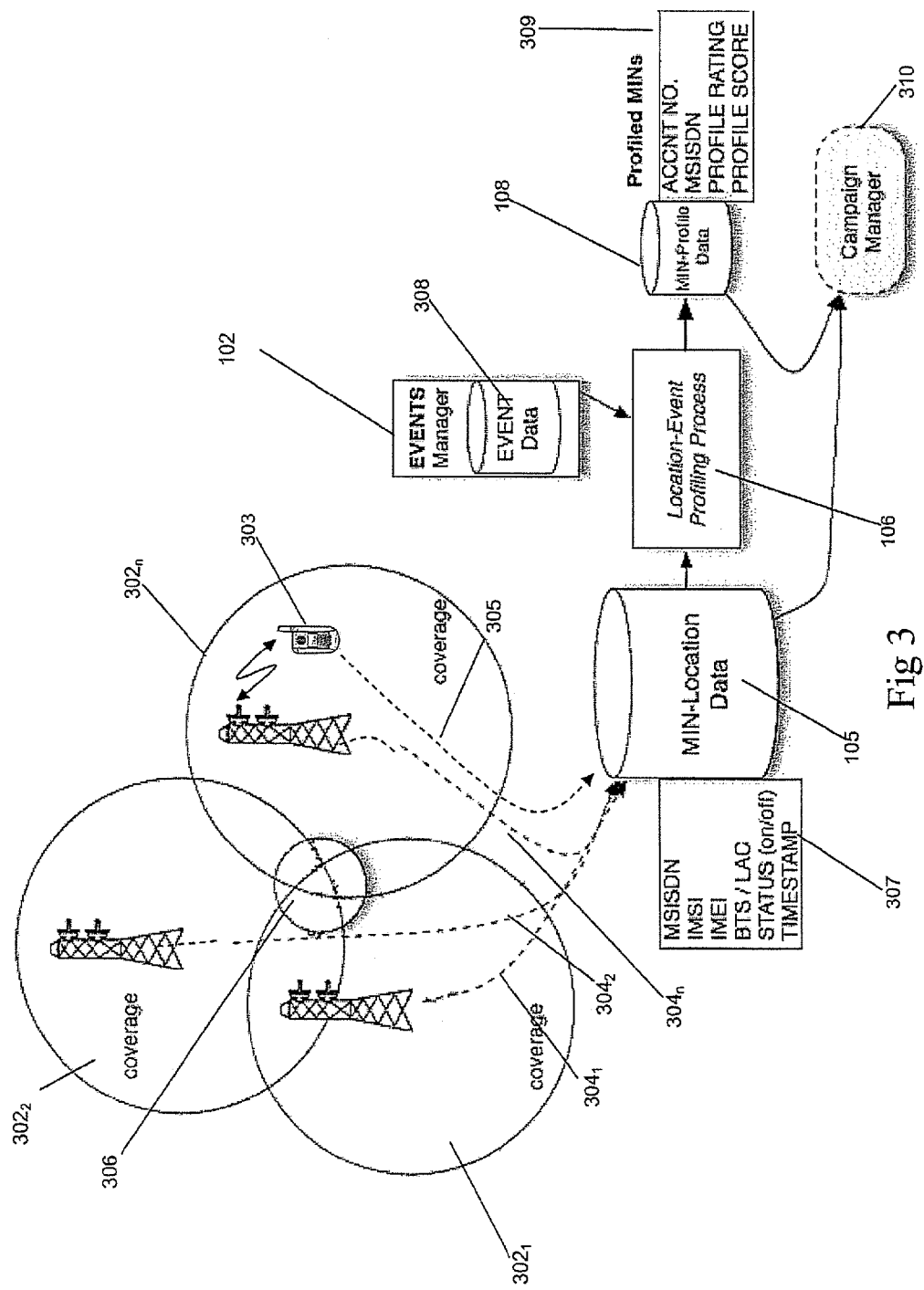
FIG. 3 is a schematic diagram depicting one application of the profiling system according to one embodiment of the present invention.

One example of the use of the content delivery system according to one embodiment of the invention is shown in FIG. 3. In this instance the location based system is a mobile communications network 301 having a plurality of cells $302_1, 302_2, \ldots, 302_n$. As illustrated a mobile subscriber 303 is free to roam with the network 301. Location update information from each of the cells $302_1, 302_2, \ldots, 302_n$ is sent back $304_1, 304_2, 304_n$ to the location database 105. The location update information may include its cell ID, the subscriber's MSISDN, IMSI, and/or IMEI and handset status (on/off).

The location database in this example stores a record 307 of the subscriber's location including the MSISDN, IMSI, IMEI, current BTS/LAC, status and the time at which the information was received from the network. As with the above examples the location database then provides the location information as a data feed to the profiling engine 106. The profiling engine 106 then compares the location data with event data 308 provided by the event manager 104. As above the event data (event parameters) are entered by the end-user via an appropriate portal or user interface (UI). The resultant profile data 309 produced by the profiling engine may in this instance include the subscriber's account number with the network service provider, a set of event counts and a set of profile scores. The profile data 309 is then stored to the profiles database 108. While the MSISDN may form part of the data store in the database of location data 105 the resultant profile data compiled from the location data excludes the MSISDN as it is considered sensitive information and normally should not be revealed.

Both the profile data 309 may then be utilised by the campaign manger 310 of the end user to construct a plurality of candidate subscriber groups. Each of the candidate subscriber groups are then associated with a specific content package. Each content package includes content specifically targeted at each subscriber within the candidate subscriber groups. The relevant content packages are then delivered to each subscriber based on the subscriber accounts associated with the event or profile set as an aggregate tally. Thus the present system allows for the provision of multiple content packages to subscribers within a given location e.g. multiple subscribers from differing candidate groups being serviced by same BTS, to subscribers observed to have attended a particular event or to subscribers belonging to a particular profile.

As the subscriber is free to roam within the network a handoff between cells $302_1, 302_2, \ldots, 302_n$ is often performed. When the mobile subscriber changes serving base stations (BTS) or moves from one are to another an update as to the handset's location is sent to the location database 105. As shown in FIG. 3 there may be instances where the subscriber is in a region 306 of overlap between cells, such instances a hand over operation may occur. Typically the decision to hand over is made on the basis of signal strength from the BTS. Thus, it is possible for the location of the subscriber to move from one cell to another without a change in the physical location of the subscriber. In such cases this can lead to the subscriber receiving content relating to services within the current serving cell which are not necessarily relevant to the subscriber based on their current physical location.

In order to account for these errors the profiling system of the present invention employs the use of a probabilistic profiling mechanism to produce a profile rating and profile score for each subscriber. The probabilistic profiling engine in this instance produces a probability rating of the likelihood that a given subscriber belong to a given profile type based on the aggregation of multiple profile scores of the subscriber for multiple events. For instance attendance at several distinct game events of the same event type increases the probability that the subscriber belongs to a particular profile type than if they attend only a few event of the same event type. For example, if a subscriber regularly attends basket ball games at one or more locations there is a high probability that the subscriber belongs to the basket ball fan profile group. Further probability measures for the subscriber can be produced in order to determine the most likely type of basket ball the subscriber is i.e. pro, college, high school etc by matching the location with the scheduled event and applying an appropriate weighting to each attendance (i.e. the probability measure for a main class may be compiled of probability measures for a number of subclasses with the main class).

Using the basketball illustration in the preceding paragraph for an appropriate weighting to each attendance, if there are three subscribers A, B, C to be profiled under three profile type—profile 1—college basketball fan, profile 2—local basketball team fan, and profile 3—basketball fan; according to three game events: event 1—local team game event; event 2—national game 1; and event 3—national game 2

Then the following profile score could be assigned by the event manager 104 to each event:

For event 1—profile 1 is assigned a profile score of 2, profile 2 is assigned a profile score of 5, and profile 3 is assigned a profile score of 1;

For event 2—profile 3 is assigned a profile score of 1; profile 1 and 2 are assigned profile scores of 0;

For event 3—profile 3 is assigned a profile score of 2; profile 1 and 2 are assigned profile scores of 0;

Applying the above to the profiling of a user, if subscriber A attends event 2, then the attendance at event 2 will earn him/her a profile score of 1 for profile 3.

If subscriber B attends event 2 and event 3, then the attendance at events 2 and 3 will earn him/her profile scores of 2 for event 2 and 1 for event 3, earning him/her a total profile score of 3 for profile 3.

If subscriber C attends event 1, then the attendance at event 1 will earn him/her profile scores of 2 for profile 1; 5 for profile 2; and 1 for profile 3.

Based on the profile scores allocation, when determining the subscriber who is most likely to be considered as a "basketball fan" it would be subscriber B.

It is to be appreciated that the profile score allocation for each subscriber may be refined as more events are introduced to the system. For example, subscriber B mentioned in the above example may possibly be re-allocated to other profile types if he/she were to attend other event with different profile score.

Figure 4:
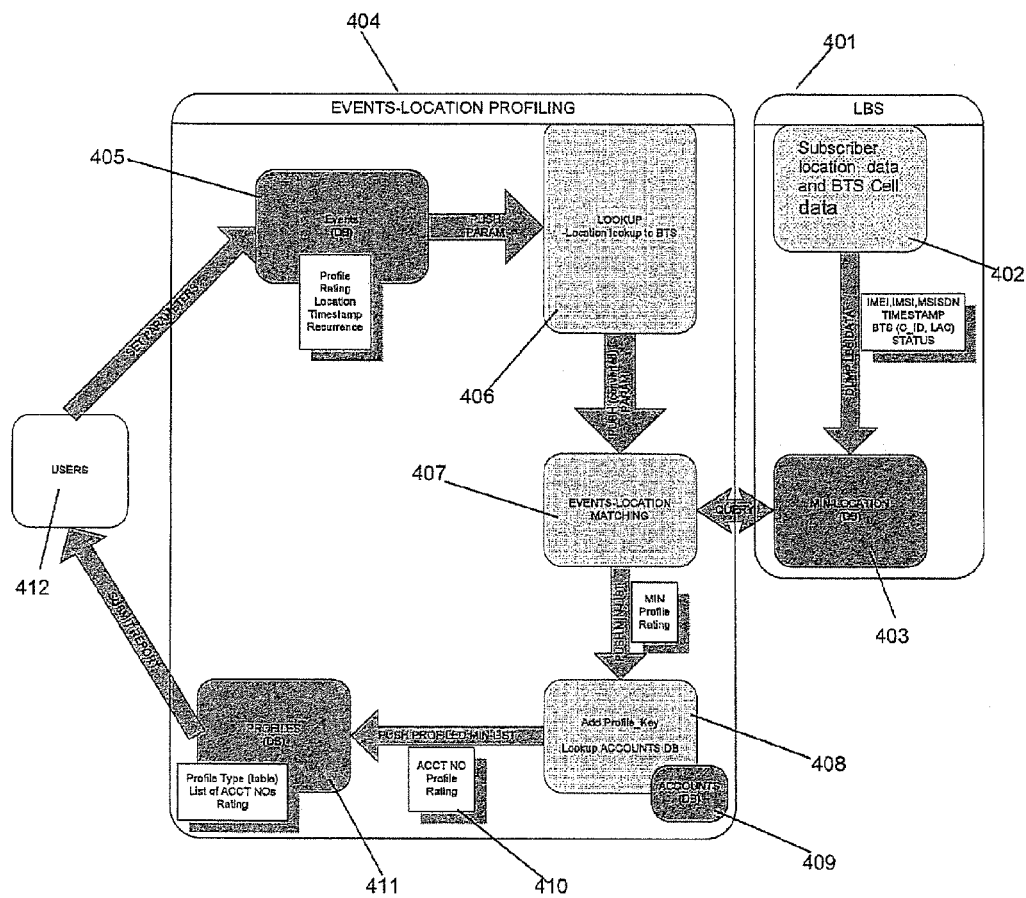
FIG. 4 is a schematic diagram of the process architecture of the profiling system of FIG. 3.

FIG. 4 depicts the process steps associated with the use of the events profiling system in the mobile communications network of FIG. 3. The right hand side of the diagram represents the information received from the network 401. As above location data from the BTS and subscriber handsets 402 is stored to the location database 403.

The left hand section of FIG. 4 depicts the process step associated with the event profiling 404. As shown an end user 412 set the relevant event parameters 405 such as event name, a specified location, date and time of the event, recurrence etc. These parameters are then passed to the profiling engine 106. In the present example the end-user 412 specifies the location in terms of BTS ID's via the use of a graphical map display. The graphical map display shows a local map with an overlay of BTS coverage. The end-user selects the area of interest and the system is then able to identify each BTS from the map via a simple look-up operation 406 and saves this set of BTS ID's as a location parameter.

Once the event location is mapped to a specified network asset is completed the profiling engine 106 proceeds to match 407 a given event with the location information of the subscribers currently utilising the network (the matching criteria employed by the profiling engine is discussed in greater details below). As the resultant profile data potentially contains MSISDN information, it is necessary to perform a masking process 408. This is as a subscriber's MSISDN (or MIN) data is considered very sensitive, and appropriate safe guards must be utilised to protect this information. In the present example the profiling engine masks the MSISDN by transforming and mapping the MSISDN to the subscriber's account number. During the masking phase 408 the acquired MSISDN's are compared against the network service provider's accounts database 409. Once a match is determined the subscriber's account number is mapped to the MSISDN number 410.

After assignment of account number to the profile data, the profiling engine then stores each list of account numbers into corresponding profile type tables and event tables which are maintained on the profile database 411. The profile type table in this instance includes the profile type the list of Account Numbers. If no profile type table exists the system creates a new table for storage.

Figure 5:
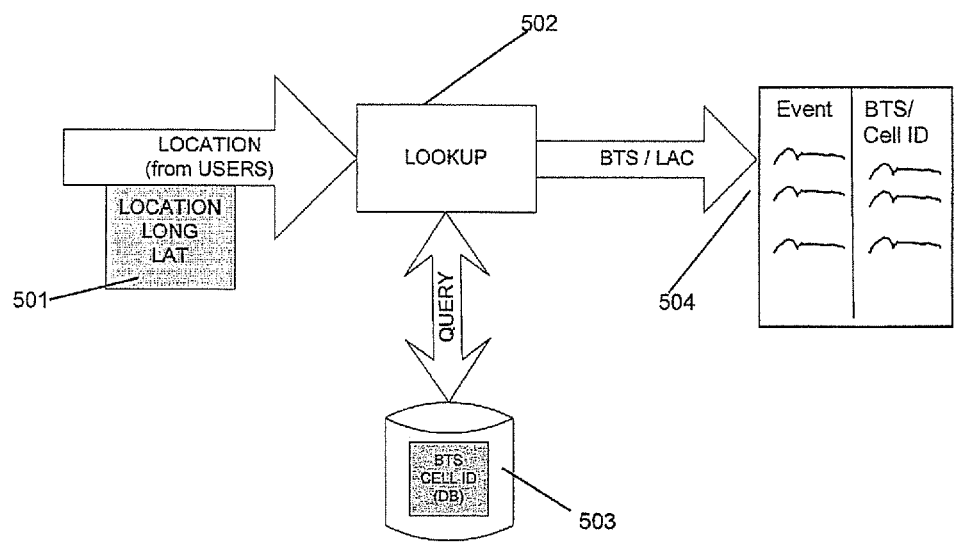
FIG. 5 is a schematic diagram depicting the translation of an event location to a base station/cell ID according to one embodiment of the invention.

As noted above, as the location input by the users is via a graphical user interface, an alternative to the use of a GUI is to input the geographic location as a co-ordinates or set of co-ordinates (e.g. street address, GPS or GIS mark etc) of the specific event. In such instances it is necessary to translate the location to a BTS or a Cell ID/LAC. One example of this translation/lookup process is shown in FIG. 5. Here the location inputted by the end user is firstly converted to a longitude and latitude 501 bearing. The relevant longitude and latitude bearings for the given event are then compared 502 to the longitude and latitude bearings for each BTS 503 within the network. Typically each of the longitude and latitude of the BTS are associated with a given Cell ID for network diagnostics etc. Thus once the system identifies the BTS with closest longitude and latitude bearing to that of the event location the Cell ID/LAC can be readily obtained. The result of the look up is a listing of BTS and Cell ID/LAC for each event location inputted by the end user 504.

Each event location is then matched with the corresponding BTS and Cell ID/LAC stored in the location information database to identify a listing of subscribers currently within the coverage area of the relevant base station, and are therefore potentially in the vicinity of the specified event.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A method of providing content to a plurality of subscribers of a communications network comprising the steps of:
   receiving by a profiling engine connected to the communications network, a set of event parameters associated with an event from a third party, wherein the event parameters include an event location;
   receiving location information for each subscriber within the plurality of subscribers from the communications network; wherein:
   the network is a mobile communications network comprising at least one mobile communications base station as an access point to which one or more of the plurality of subscribers are connected;
   the subscribers use a handset to communicate over the mobile communications network; and
   the location information includes information as to the subscribers' current location within the network, and a geographical location information of the at least one mobile communications base station to which the subscribers are connected;
   comparing the event parameters from said third party with the location information for each subscriber to identify one or more subscribers within the plurality of subscribers within a predetermined range of the event associated with the event parameters; wherein:
   the event location is converted to a longitude and latitude bearing that is compared with a listing of geographical locations of each mobile communications base station;
   assigning a profiling weight to the event associated with the event parameters;

profiling each of the one or more subscribers to produce a profile rating and/or profile score wherein the profile rating and/or profile score is an instance based count multiplied by the profiling weight and are indicative of likelihood of a given subscriber to attend the event, and wherein the profile rating and/or profile score are produced based on a history of events attended by the given subscriber;

sorting the one or more subscribers into a number of categories based on the profile rating and/or profile score; wherein the profile score and/or profile rating is a probabilistic rating of a likelihood of each subscriber belonging to a particular behavioral or profile category included in the number of categories; and each subscriber is identified to belong to the particular behavioral or profile category included in the number of categories based on the profile rating and/or score;

compiling content for each category of subscribers wherein the content for each category of subscriber contains information specific to its subscriber category; and delivering the content to said one or more subscribers within range of the event.

2. The method of claim 1 wherein the instance based count is a count of amount of time one or more subscribers attend a specified event.

3. The method of claim 2 wherein the profile rating and/or profile score is modified as additional information on subscriber transactions gathered from the network.

4. The method of claim 3 wherein the additional information includes information on the subscriber actions within the communications network.

5. The method of claim 4 wherein the subscriber actions include at least one of the following actions: signing up to a service, purchase through mobile ad and/or usage and VAS transactions.

6. The method of claim 2, wherein the count may include or exclude cases of partial attendance based on operator defined preference, and where it is included the criteria for partial attendance may also be operator defined.

7. The method of claim 1 further including the step of masking specific portions of the location information.

8. The method of claim 7 wherein the step of masking includes mapping the subscriber's MSISDN to an identification number assigned to the subscriber.

9. The method of claim 8 wherein the identification number is assigned to the subscriber during the profiling step.

10. The method of claim 8 wherein the identification number is the subscriber's account number assigned by the network service provider.

11. The method of claim 1 wherein the step of profiling one or more subscribers includes logging the location information to determine movement patterns of the one or more subscribers within the communications network.

12. The method of claim 11 wherein the movement patterns include identifying prolonged static periods, repetitive ingress or egress at particular locations, repetitive ingress or egress or across multiple locations.

13. The method of claim 12 further including the step of recording a time at which a particular movement occurred.

14. The method of claim 1 wherein the location information is augmented by information received from the subscriber's handset.

15. The method of claim 14 wherein the information provided by the subscriber's handset includes the subscriber's MSISDN, IMSI, and/or IMEI and handset status (on/off).

16. The method of claim 1 wherein the weighting is assigned on the basis of event type.

17. The method of claim 16 wherein the weighting is applied to each specific event at a specific location and wherein the weighting varies depending on the event type.

18. The method of claim 1 wherein the event is selected from at least one of the following: concerts, sporting events, movie and/or promotional sales.

19. The method of claim 1 wherein the event is an identifier for a particular service or limited time promotional offers.

20. The method of claim 1 wherein the event parameters include at least one of the following parameters: event name, event date and event and/or event frequency.

21. The method of claim 1 wherein the location information further includes information as to the coverage range of the network access point currently servicing the subscriber.

22. The method of claim 1 wherein the location information further includes a base station ID.

23. The method of claim 1 wherein the location information is augmented by any of the following positioning mechanisms: uplink time of arrival (TOA), enhanced observed time difference (E-OTD), global positioning system (GPS) assisted.

24. The method according to claim 1, wherein the profile rating and/or scores are aggregated for multiple events.

* * * * *